US010589635B1

(12) United States Patent
Solodovnik et al.

(10) Patent No.: US 10,589,635 B1
(45) Date of Patent: Mar. 17, 2020

(54) ACTIVE VOLTAGE CONTROL FOR HYBRID ELECTRIC AIRCRAFT

(71) Applicant: The Boeing Company, Chicago, IL (US)

(72) Inventors: Eugene V. Solodovnik, Lake Stevens, WA (US); Mark E. Liffring, Seattle, WA (US); Kamiar J. Karimi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/289,900

(22) Filed: Mar. 1, 2019

(51) Int. Cl.
*B60L 50/13* (2019.01)
*B60R 16/033* (2006.01)
*B60L 58/20* (2019.01)
*B60L 15/20* (2006.01)

(52) U.S. Cl.
CPC ............ *B60L 50/13* (2019.02); *B60L 15/2045* (2013.01); *B60L 58/20* (2019.02); *B60R 16/033* (2013.01)

(58) Field of Classification Search
CPC .......... B60L 50/00; B60L 50/10; B60L 50/11; B60L 50/12; B60L 50/13; B60L 50/14; B60L 58/20; B60L 15/2045; B60L 16/033
See application file for complete search history.

(56) References Cited

U.S. PATENT DOCUMENTS

| 4,941,079 | A | 7/1990 | Ooi | |
|---|---|---|---|---|
| 5,587,647 | A * | 12/1996 | Bansal | F02N 11/04 290/31 |
| 8,212,371 | B2 | 7/2012 | Maibach et al. | |
| 2009/0195074 | A1* | 8/2009 | Buiel | H02J 3/28 307/48 |
| 2015/0115108 | A1 | 4/2015 | Benson et al. | |
| 2017/0237381 | A1* | 8/2017 | Shinohara | H02P 29/027 318/400.27 |
| 2018/0205229 | A1* | 7/2018 | Mouni | H02M 7/72 |

* cited by examiner

*Primary Examiner* — Adolf D Berhane
(74) *Attorney, Agent, or Firm* — Ostrager Chong Flaherty & Broitman P.C.

(57) ABSTRACT

A solid-state high-voltage direct-current (HVDC) bus voltage controller to provide active power flow control in a hybrid electric aircraft power supply system. The HVDC bus voltage controller includes an active voltage controller and an active rectifier unit configured to control the HVDC bus voltage using the PWM control technique. In one implementation, the active rectifier unit includes high-power and high-frequency semiconductor switches with fast turn-off capabilities. The active voltage controller sends an HVDC bus reference voltage to the active rectifier unit. The low-level controller inside the active rectifier unit is configured to control the HVDC bus voltage to match the HVDC bus reference voltage.

20 Claims, 4 Drawing Sheets

ACTIVE VOLTAGE CONTROL FOR HYBRID ELECTRIC AIRCRAFT

BACKGROUND

This disclosure generally relates to hybrid electrical power sources having two or more electrical energy sources that supply energy to a connected load. In particular, the technology disclosed herein relates to hybrid electrical power sources comprising one or more batteries and one or more electric generators driven by internal combustion engines or gas turbine engines.

Some aircraft have electrically powered propulsion systems (hereinafter "electric aircraft"). In such aircraft, electric motors convert electrical power into mechanical power for use by the propulsion system. For example, an electric motor may turn one or more propellers on the aircraft to provide thrust. An electric aircraft may take various forms. For example, the electric aircraft may be an aircraft, a rotorcraft, a helicopter, a quadcopter, an unmanned aerial vehicle, or some other suitable type of aircraft.

When electric motors are used for propulsion of the aircraft, electrical energy may be supplied by a power source. For instance, electrical energy may be supplied using a battery system. The load on the battery system or other power source is an important consideration for the design and manufacturing of the aircraft. For example, the amount of electrical energy used by the electric motor to move the aircraft during various stages of flight may be important. Electric motors that use battery systems may require the battery to be recharged after a specified amount of time, distance, electrical energy use, or a combination thereof.

Some electric aircraft have a hybrid electric power architecture (hereinafter "hybrid electric aircraft") in which at least two different types of power sources are connected in parallel to a load. The electrical energy sources will often have different electrical characteristics. For example, the electrical energy sources may be a battery and an electric generator driven by an internal combustion engine or a gas turbine engine. The battery supplies electrical power to an electric motor that is arranged to convert electrical power into mechanical power for use by the propulsion system of the aircraft.

In the case of a battery-equipped hybrid electric aircraft, the battery voltage cannot be actively controlled. Battery voltage is determined by the number of cells, type of cells, battery state of charge (SOC), loading and other factors. It is necessary to control power flow to and from the battery. Rate of charge or discharge of the battery is important and should be controlled to avoid thermal runaway.

For hybrid electric aircraft, the batteries are large and designed to provide a large amount of power for the purpose of propulsion. The batteries are paralleled with other power sources, such as electric generators. In one implementation, the battery is connected to a high-voltage direct-current (HVDC) bus, which is also supplied by the generator source(s). As used in the aerospace industry and herein, the term "high voltage" in the context of direct current means any DC voltage higher than 500 $V_{DC}$. Such DC high voltage is typically derived from rectification of three-phase 230 $V_{AC}$ power.

There are no existing solutions for active power flow control and battery power management control for hybrid electric aircraft that employ batteries with hundreds of kilowatt-hours of energy. A system and method for tightly controlling the power flow to and from the battery at the HVDC connection is wanted.

SUMMARY

The subject matter disclosed in some detail below is directed to a power supply system architecture for a hybrid electric aircraft. The power supply system includes a solid-state HVDC bus voltage controller that provides active control of the flow of DC power to the propulsion motors of the hybrid electric aircraft power supply system. The HVDC bus voltage controller includes an active voltage controller and an active rectifier unit configured to control the HVDC bus voltage using a pulse-width modulated (PWM) control technique. In one implementation, the active rectifier unit includes high-power and high-frequency semiconductor switches with fast turn-off capabilities. The PWM control technique is used to effect a desired power transmission. Control of the voltage of the HVDC bus enables controlled charge or discharge of the battery and desirable power flow in the system.

More specifically, the power supply system includes an alternating-current (AC) generator connected to an AC bus, a high-voltage direct-current (HVDC) battery connected to an HVDC bus, an AC-to-DC power converter connecting the AC bus to the HVDC bus, and an active voltage controller configured to control the power flow to and from the battery at an HVDC connection. The active voltage controller is situated at an output of the battery. The active voltage controller sends a control signal representing the magnitude of an HVDC bus reference voltage to the active rectifier unit. The low-level controller inside the active rectifier unit is configured to control the HVDC bus voltage to match the HVDC bus reference voltage.

The active voltage control method disclosed herein allows for accurate control of the battery charge or discharge rate. In addition, the active voltage controller allows for precise power flow management in the hybrid electric aircraft. Depending on flight phase, aircraft mission, battery SOC, remaining hydrocarbon fuel, flight conditions, etc., the active voltage controller is configured to accurately manage the power flow to the propulsion system, in some instances taking more power from the battery source and less power from the conventional engine source or in other instances preserving battery power, while using more power generated from an engine source. The architecture disclosed herein is reliable and low weight. The use of an active voltage controller could also extend the life of the batteries, resulting in cost savings.

Although various embodiments of systems and methods for actively controlling the voltage of a bus that supplies electric power from a battery and/or generator to propulsion motors of a hybrid electric aircraft will be described in some detail below, one or more of those embodiments may be characterized by one or more of the following aspects.

One aspect of the subject matter disclosed in detail below is a hybrid electrical power supply system for supplying current to a load, the hybrid electrical power supply system comprising: an AC power source; an AC bus; first switching means arranged to switchably couple AC power from the AC power source to the AC bus; an HVDC power source; an active voltage controller configured to generate a control signal representing a magnitude of a HVDC bus reference voltage; an active rectifier unit comprising an active rectifier configured to convert AC power to HVDC power and a controller configured to control the active rectifier to adjust an HVDC bus voltage in dependence on the control signal received from the active voltage controller; second switching means arranged to switchably couple AC power from the AC bus to the active rectifier unit; an HVDC bus coupled to receive DC power from one or both of the HVDC power source and active rectifier unit in dependence on the HVDC bus voltage from the active rectifier unit; and an HVDC load coupled to receive HVDC power from the HVDC bus. The active voltage controller comprises a computer or processor programmed to generate the control signal in different forms corresponding to different magnitudes of the HVDC bus reference voltage; and the controller of the active rectifier unit is configured to control the active rectifier to adjust the HVDC bus voltage of the HVDC bus in dependence on the magnitude of the HVDC bus reference voltage.

In accordance with some embodiments of the hybrid electrical power supply system described in the immediately preceding paragraph, the HVDC load comprises a motor controller coupled to receive HVDC power from the HVDC bus, the AC power source comprises an electrical generator and the HVDC power source comprises a battery.

In accordance with some embodiments, the hybrid electrical power supply system further comprises a flight power management controller configured to send power flow management commands to the active voltage controller to optimize overall energy usage and reduce fuel burn during a particular mission of an aircraft. The active voltage controller generates an initiate descent message when both of first and second conditions are met, the first condition being that a state of charge of the battery is less than a minimum state of charge reserve, and the second condition being that a fuel reserve is less than a minimum fuel reserve. The flight power management controller is further configured to send a command to the active voltage controller to charge the battery if the aircraft is on ground, the battery is discharged and a power source is available. In addition, the flight power management controller is further configured to perform operations comprising: determining what is the current phase of the flight of the aircraft; determining the battery state of charge; determining the fuel level; adjusting a battery usage profile in dependence on the flight phase, battery state of charge and fuel level; setting a battery discharging or charging current in accordance with the adjusted battery usage profile; and commanding the active voltage controller to cause the battery to be discharged or charged in accordance with the set battery discharging or charging current.

Another aspect of the subject matter disclosed in detail below is an aircraft comprising: an AC power source; an AC bus; first switching means arranged to switchably couple AC power from the AC power source to the AC bus; an HVDC power source; an active voltage controller configured to generate a control signal representing a magnitude of a HVDC bus reference voltage based on a current of the HVDC power source; an active rectifier unit comprising an active rectifier configured to convert AC power to HVDC power and a controller configured to control the active rectifier to adjust an HVDC bus voltage of the HVDC bus in dependence on the control signal received from the active voltage controller; second switching means arranged to switchably couple AC power from the AC bus to the active rectifier unit; an HVDC bus coupled to receive DC power from one or both of the HVDC power source and active rectifier unit in dependence on the HVDC bus voltage from the active rectifier unit; an electric propulsion motor coupled to receive HVDC power from the HVDC bus; and a propeller operatively coupled to the electric propulsion motor. The active voltage controller comprises a computer or processor programmed to generate the control signal in different forms corresponding to different magnitudes of the HVDC bus reference voltage. The controller of the active rectifier unit is configured to control the active rectifier to adjust the HVDC bus voltage of the HVDC bus in dependence on the magnitude of the HVDC bus reference voltage. The aircraft further comprises a flight power management controller configured to send power flow management commands to the active voltage controller to optimize overall energy usage and reduce fuel burn during a particular mission. In accordance with one embodiment, the AC power source comprises an electrical generator and the HVDC power source comprises a battery.

In accordance with one embodiment of the aircraft described in the immediately preceding paragraph, the flight power management controller is configured to send a command to the active voltage controller to charge the battery if the aircraft is on ground, the battery is discharged and a power source is available. In accordance with the same or an alternative embodiment, the flight power management controller is configured to perform operations, if the aircraft is in flight, comprising: determining what is the current phase of the flight of the aircraft; determining the battery state of charge; determining the fuel level; adjusting a battery usage profile in dependence on the flight phase, battery state of charge and fuel level; setting a battery discharging or charging current in accordance with the adjusted battery usage profile; and commanding the active voltage controller to cause the battery to be discharged or charged in accordance with the set battery discharging or charging current.

A further aspect of the subject matter disclosed in detail below is a method for supplying HVDC power to an HVDC load via an HVDC bus that is coupled to receive DC power from one or both of an HVDC power source and an active rectifier unit that is coupled to an AC power source, the method comprising: generating a control signal in an active voltage controller in a form representing a magnitude of a HVDC bus reference voltage; and controlling the active rectifier unit to adjust an HVDC bus voltage of the HVDC bus in dependence on the magnitude of the HVDC bus reference voltage.

In accordance with one embodiment of the method described in the immediately preceding paragraph, the AC and HVDC power sources are respectively an electric generator and a battery onboard an aircraft, and the method further comprises: sending power flow management commands from a flight power management controller onboard the aircraft to the active voltage controller to optimize overall energy usage and reduce fuel burn during a particular mission of an aircraft by adjusting the magnitude of the HVDC bus reference voltage relative to a voltage of the battery.

Other aspects of systems and methods for actively controlling the voltage of a bus that supplies electric power from a battery and/or generator to propulsion motors of a hybrid electric aircraft are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of systems and methods for actively controlling the voltage of a bus that supplies electric power from a battery and/or generator to propulsion motors of a hybrid electric aircraft are described in some detail below. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A single hybrid electric aircraft may have one or more HVDC power sources (e.g., batteries) and one or more generator sources driven by a prime mover (e.g., a gas turbine engine or an internal combustion engine). The multiple sources need to be controlled and managed to achieve the optimal power extraction for the specific mission given changing operating conditions of the batteries, aircraft and environment.

More generally, the hybrid electrical power supply system proposed herein is not limited in its application to hybrid electric aircraft. In accordance with one architecture, the hybrid electrical power supply system proposed herein includes the following components: an AC power source; an AC bus; first switching means arranged to switchably couple AC power from the AC power source to the AC bus; an HVDC power source; an active voltage controller configured to generate a control signal representing a magnitude of a HVDC bus reference voltage; an active rectifier unit comprising an active rectifier configured to convert AC power to HVDC power and a controller configured to control the active rectifier to adjust an HVDC bus voltage in dependence on the control signal received from the active voltage controller; second switching means arranged to switchably couple AC power from the AC bus to the active rectifier unit; an HVDC bus coupled to receive DC power from one or both of the HVDC power source and active rectifier unit in dependence on the HVDC bus voltage from the active rectifier unit; and an HVDC load coupled to receive HVDC power from the HVDC bus. One example of an embodiment of the foregoing architecture, designed for powering an electric aircraft, will be described in some detail below.

Figure 1:
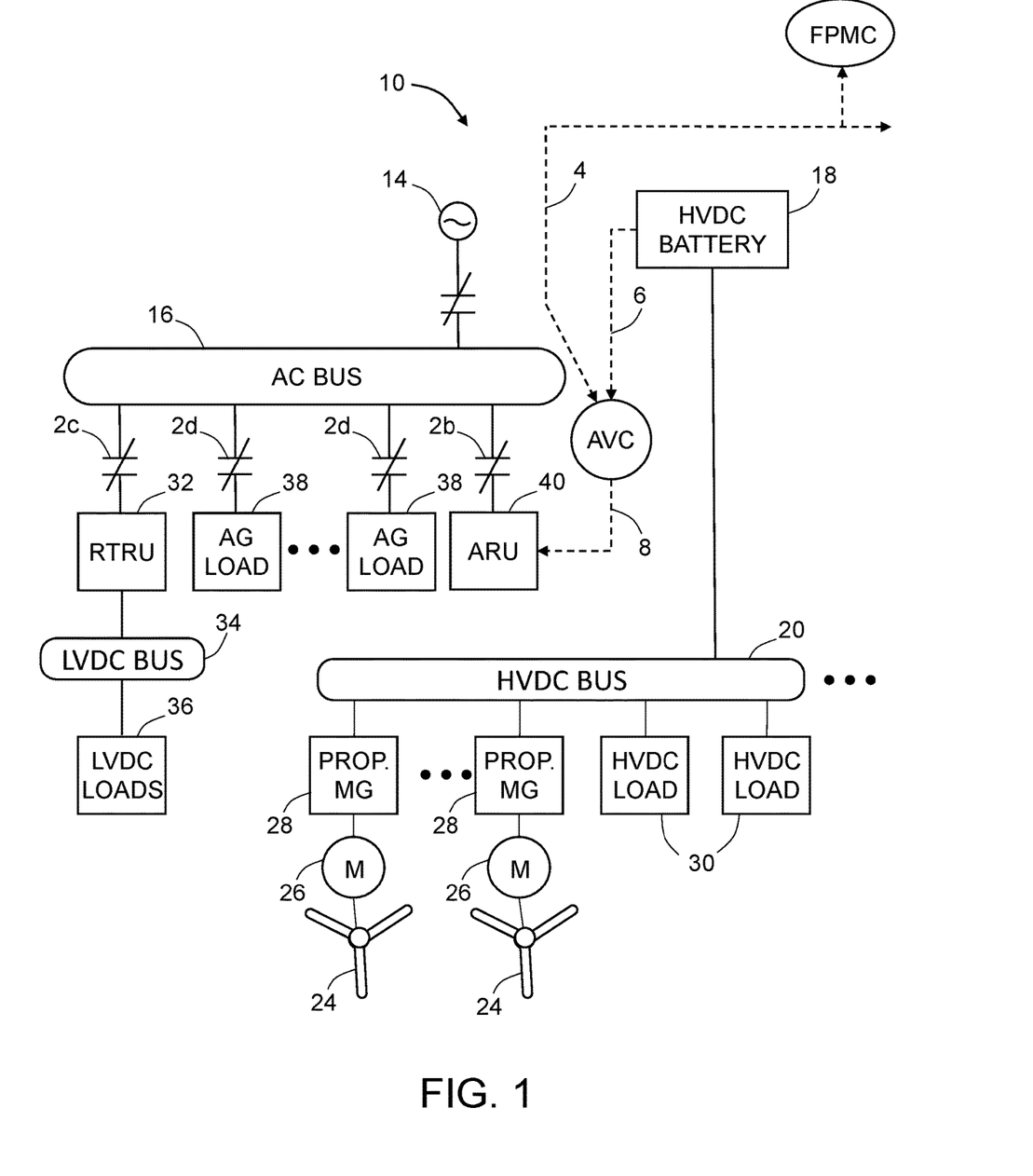
FIG. 1 is a block diagram depicting a hybrid electric aircraft power supply system architecture with a flight power management controller (FPMC), at least one active voltage controller (AVC) and at least one active rectifier unit (ARU) in accordance with one embodiment.

FIG. 1 is a block diagram depicting in some detail a proposed architecture for a power supply system 10 of a hybrid electric aircraft in accordance with one embodiment.

In this example, the hybrid electric aircraft has four propellers 24 (two on each wing). Only two propellers 24 rotatably mounted to one wing and associated power supply system components are depicted in FIG. 1. The power supply system 10 depicted in FIG. 1 further includes a flight power management controller 12 (hereinafter "FPMC 12"). All of the other components identified in FIG. 1 are associated with one wing of the hybrid electric aircraft and form one half of the power supply system 10. The other half (not shown in FIG. 1) of the power supply system 10 includes duplicate components associated with the other wing. The FPMC 12 manages the electrical propulsion power supplied to both wings.

In accordance with one embodiment, each propeller 24 is driven to rotate by a respective electric propulsion motor 26. In an alternative embodiment, each electric propulsion motor 26 drives multiple propellers. Each electric propulsion motor 26 operates under the control of a respective propulsion motor controller 28, which receives aircraft propulsion power from an HVDC bus 20. In one proposed implementation, the FPMC 12 is a computer configured (e.g., by software) to manage the HVDC power supplied to the propulsion motor controllers 28.

The portion of the power supply system 10 depicted in FIG. 1 further includes two AC generators 14 and two HVDC batteries 18. Each AC generator 14 is mechanically driven by an internal combustion engine or a gas turbine engine (not shown in FIG. 1). Only one AC generator 14 and one HVDC battery 18 (associated with one wing of the hybrid electric aircraft) are shown in FIG. 1.

As used herein, the term "battery" includes least one battery cell inside a battery case and at least one sensor located inside or outside the battery case. In a preferred embodiment, the battery includes a temperature sensor, a current sensor and a voltage sensor. In the context of the active voltage controller described in more detail below, the term "measuring the battery current" means receiving an output of the current sensor and converting the current sensor output to a measurement value.

Referring again to FIG. 1, the terminals (not shown in the drawings) of the HVDC battery 18 are directly electrically connected by electrical wiring to the HVDC bus 20. The terminals of the AC generator 14 are electrically connected by electrical wiring to an AC bus 16 via a contactor 2a.

As used herein, the term "contactor" means an electrically controlled switch. Typically the contactor is controlled by a circuit which has a lower power level than the switched circuit. A typical contactor comprises contacts and an electromagnet contained in a housing. The contacts are the current-carrying parts of the contactor. The electromagnet provides the driving force to close the contacts. A spring may be provided to return the electromagnet core to its open position relative to the electromagnet coil. The housing is an enclosure made of an electrically insulating material.

The portion of the power supply system 10 depicted in FIG. 1 further includes an active rectifier unit 40 having input terminals that are electrically connected by electrical wiring to the AC bus 16 via a contactor 2b. The output terminals of the active rectifier unit 40 are also electrically connected by electrical wiring to the HVDC bus 20. The active rectifier unit 40 is controlled to operate in a manner that incoming AC power received from the AC bus 16 is converted to outgoing HVDC power supplied to the HVDC bus 20. The propulsion motor controllers 28 and multiple other non-propulsive HVDC loads 30 receive HVDC power from the HVDC bus 20.

The portion of the power supply system 10 depicted in FIG. 1 further includes a regulated transformer rectifier unit (RTRU) 32 having input terminals that are electrically connected by electrical wiring to the AC bus 16 via a contactor 2c. The system also includes a low-voltage direct-current (LVDC) bus 34 that receives regulated AC power from the regulated transformer rectifier unit 32. In addition, other non-propulsive AC loads 38 receive AC power from the AC bus 16 via respective contactors 2d and connecting electrical wiring.

The portion of the power supply system 10 depicted in FIG. 1 further includes an active voltage controller 22 that is configured to receive (wirelessly or via wires) sensor data 6 representing the state of the from the HVDC battery 18 and then send (wirelessly or via wires) a control signal 8 representing a magnitude of an HVDC bus reference voltage to the active rectifier unit 40. The active rectifier unit 40 in turn controls the voltage of the HVDC bus 20 to match the HVDC bus reference voltage. If the HVDC bus voltage is greater than the voltage of the HVDC battery 18 (hereinafter "battery voltage"), the HVDC battery 18 charges. The charge rate is proportional to the magnitude of the difference between the HVDC bus reference voltage and the battery voltage. Conversely, if the HVDC bus voltage is less than the voltage of the HVDC battery 18, the HVDC battery 18 discharges. The discharge rate is proportional to the magnitude of the difference between the HVDC bus reference voltage and the battery voltage. Thus the active voltage controller 22 effectively controls the charge or discharge rate of the HVDC battery 18 by adjusting the HVDC bus reference voltage supplied to the active rectifier unit 40.

In accordance with one embodiment, the active voltage controller 22 is configured to receive different mission requests (some of which are described below) from the FPMC 12. As used herein, the term "mission request" means information carried by a control signal sent (wirelessly or via wiring) from the FPMC 12 to the active voltage controller 22 (as indicated by a dashed arrow 4 in FIG. 1), which information identifies a change in the HVDC bus voltage to be executed by the active rectifier unit 40.

In accordance with some embodiments, the electric generator 14 is a wound rotor generator controlled by a generator controller unit (not shown in FIG. 1). The wound rotor generator voltage magnitude is controlled by the generator controller unit varying excitation in the rotor field winding. The frequency of the AC bus voltage cannot be controlled. Because of that, AC loads have a motor controller or a power converter at their front end to adjust to the varying nature of the AC bus power. The power converter that converts AC bus power to HVDC bus power is the active rectifier unit 40. The active rectifier unit 40 independently controls the HVDC bus voltage. Because the HVDC battery 18 is directly connected to the HVDC bus 20, the active voltage controller 22 is provided to control the battery charge or discharge rate and for other high-level control techniques to optimize energy usage on the hybrid electric aircraft.

In accordance with other embodiments, the generator 14 is a permanent magnet generator (not shown in FIG. 1). A permanent magnet generator is a generator wherein the excitation field is provided by a rotating permanent magnet instead of a coil. The permanent magnet generator voltage, which cannot be controlled, changes depending on the speed of the prime mover and generator loading. Therefore, the AC bus voltage will be variable frequency, variable magnitude voltage. Because of that, AC loads will also require a motor controller or a power converter at the front end, similar to the previous case where the generator is a wound rotor generator with a generator controller unit. Similarly, active voltage control is provided for the power converter that converts AC bus power to HVDC bus power because the battery charge and discharge rates need to be controlled. In addition, the HVDC bus active voltage controller provides extra benefits of enabling the energy optimization control. [As used herein, the term "HVDC bus active voltage controller" refers to the active voltage controller 22 and the active rectifier unit 40 in combination.]

The active rectifier unit 40 is a solid state power converter that is configured to control the HVDC bus voltage using a PWM control technique. There are many topologies for active rectifiers including boost, buck, Vienna and others. The active rectifier unit 40 in turn is controlled by the active voltage controller 22 to enable controlling the charge and discharge rates of the HVDC battery 18 and enable energy use optimization on the hybrid electric aircraft.

Figure 2:
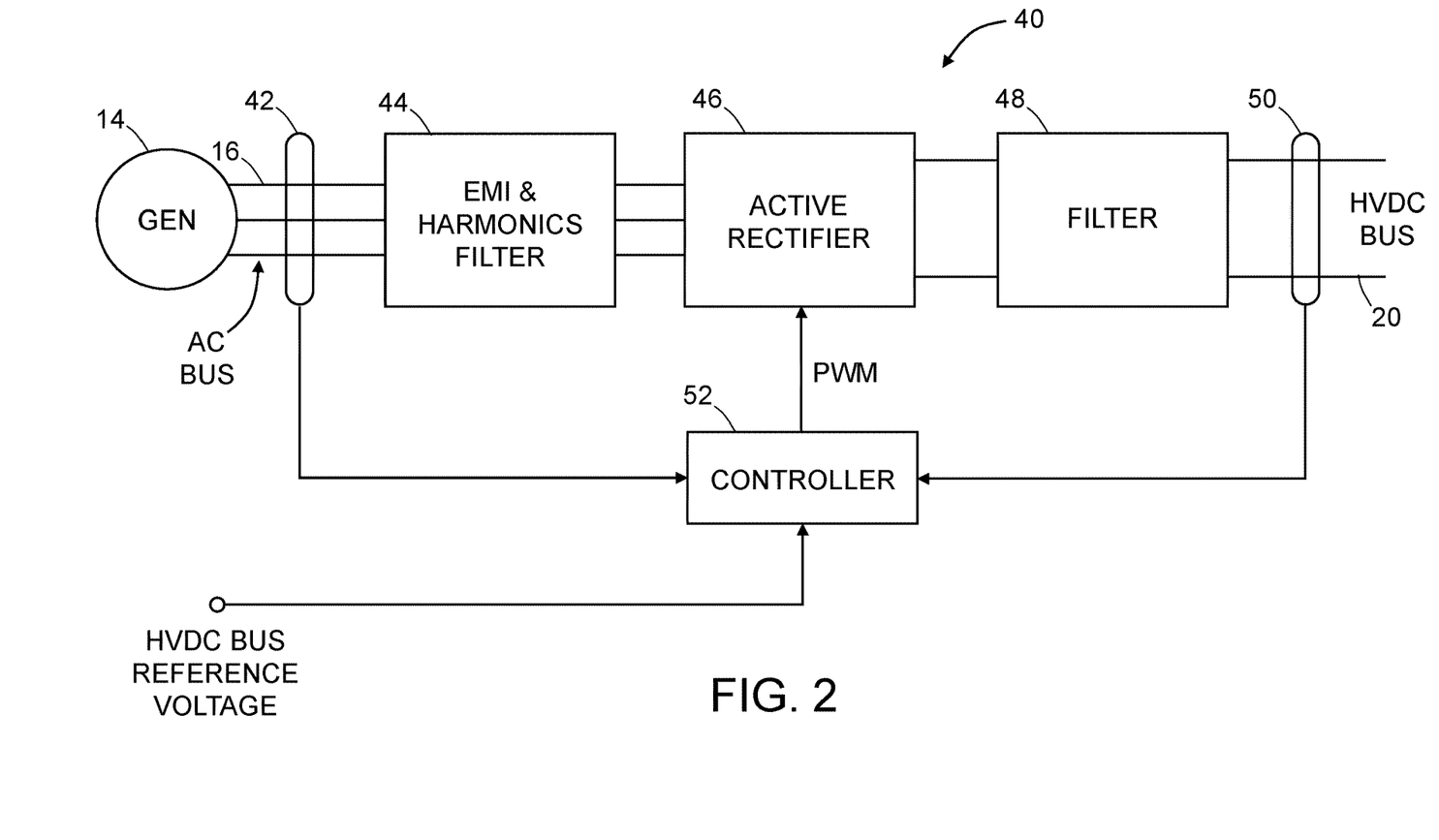
FIG. 2 is a block diagram identifying some components of the solid-state active rectifier unit included in the architecture depicted in FIG. 1.

FIG. 2 is a block diagram identifying some components of the solid-state active rectifier unit 40 included in the architecture depicted in FIG. 1. In accordance with one embodiment, the active rectifier unit 40 includes an active rectifier 46 controlled by an active rectifier controller 52. The active rectifier unit 40 further includes electromagnetic interference (EMI) and harmonics filters 44 (hereinafter "EMI and harmonics filters 44") disposed between the active rectifier 46 and the electric generator 14 and a filter 48 disposed between the active rectifier 46 and the HVDC bus 20 (not shown in FIG. 2). In addition, the active rectifier unit 40 includes voltage and current sensing circuits 42 disposed between the electric generator 14 and the EMI and harmonics filters 44 as well as voltage and current sensing circuits 50 disposed between the filter 48 and the HVDC bus 20.

The active rectifier controller 52 is configured to execute control algorithms that control the states of the switches incorporated in the active rectifier 46. The typical control algorithms for the active rectifier unit 40 include power factor correction (PFC) control for meeting AC bus power quality requirements and HVDC bus control for HVDC bus voltage regulation and HVDC bus current limitation and fault protection. The voltage and current sensing circuits 42 sense the voltage $V_{ac}$ and current $I_{ac}$ at the AC side of the active rectifier 46. The outputs of the voltage and current sensing circuits 42 are received by the active rectifier controller 52 and used to enable PFC control. The voltage and current sensing circuits 50 sense the voltage $V_{dc}$ and current $I_{dc}$ at the DC side of the active rectifier 46 are received by the active rectifier controller 52 and used to enable HVDC bus voltage regulation and current limitation and fault protection. The EMI and harmonics filters 44 and 48 (e.g., low-pass filters, each filter comprising an inductor and a capacitor) on the AC and HVDC sides of the active rectifier 46 are needed for meeting power quality requirements. The active rectifier 46 consists of a switch network that is controlled using PWM to reduce the DC component of voltage.

Pulse width modulation is a modulation technique that can be used to control the power supplied to electrical devices. The average value of voltage (and current) fed to the load is controlled by turning the switch between supply and load on and off at a fast rate. The longer the switch is on compared to the off periods, the higher the total power supplied to the load. The term "duty cycle" describes the proportion of ON time to the regular interval or "period" of time; a low duty cycle corresponds to low power, because the power is off for most of the time. The main advantage of PWM is that power loss in the switching devices is very low. When a switch is off there is practically no current, and when it is on and power is being transferred to the load, there is almost no voltage drop across the switch. Power loss, being the product of voltage and current, is thus in both cases close to zero.

In accordance with the embodiments disclosed herein, in addition to the typical active rectifier controls shown in FIG. 2, an extra outer feedback loop is provided to enable control of the HVDC battery charge and discharge rates. Additional control loops managing power flow between the battery and the generator source are also possible. Power flow management can be used to optimize energy use efficiency depending on various conditions such as battery SOC, remaining hydrocarbon fuel for the generator prime mover, flight phase, aircraft mission, etc. One example control diagram for the active voltage controller 22 that allows for battery charge and discharge rate control and for power flow management is shown on FIG. 3. The output of the active voltage controller 22 to the active rectifier unit 40 is an HVDC bus reference voltage which is either greater or less than the battery voltage. The active voltage controller 22 calculates a new HVDC bus reference voltage (whether it needs to be decreases or increased) and communicates new HVDC bus reference voltage to the active rectifier unit 40. More specifically, the active voltage controller 22 includes a current sensor that measures the battery current (hereinafter "measured battery current"). The active voltage controller 22 then controls the HVDC bus voltage by setting and sending a HVDC bus reference voltage to the active rectifier unit 40, which HVDC bus reference voltage is a function of the measured battery current.

Figure 3:
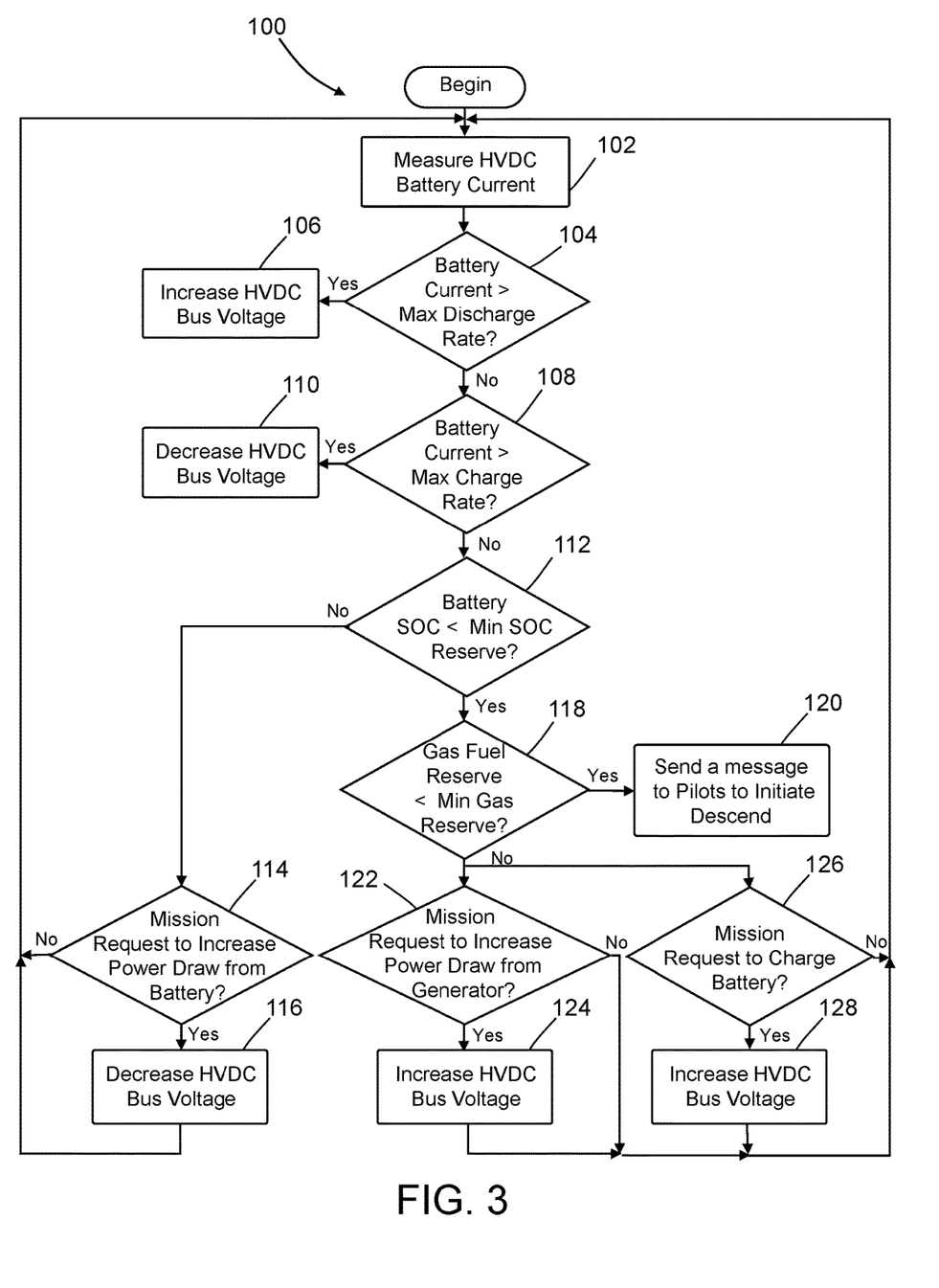
FIG. 3 is a flowchart identifying steps of a control algorithm performed by the active voltage controller in accordance with one proposed implementation.

FIG. 3 is a flowchart identifying steps of a control algorithm 100 performed by the active voltage controller 22 in accordance with one proposed implementation. The active voltage controller 22 determines the HVDC bus reference voltage in blocks "Increase HVDC bus voltage" (step 106) and "Decrease HVDC bus voltage" (step 110) shown in FIG. 3. The outcome of execution of steps 106 and 110 by the active rectifier unit 40 will be a new HVDC bus reference voltage.

First, the active voltage controller 22 measures the HVDC battery current (step 102). Then the active voltage controller 22 determines whether the battery current is greater than the maximum discharge rate or not (step 104). If a determination is made in step 104 that the battery current is discharging at a discharge rate greater than the maximum discharge rate, then the active voltage controller 22 increases the HVDC bus reference voltage and communicates that value to the active rectifier unit 40 by sending a control signal representing a magnitude of the new HVDC bus reference voltage. The active rectifier unit 40 responds to that control signal by increasing the HVDC bus voltage (step 106), thereby reducing the battery discharge rate. If a determination is made in step 104 that the battery current is not greater than the maximum discharge rate, then the active voltage controller 22 determines whether the current into the battery is greater than the maximum charge rate or not (step 108). If a determination is made in step 108 that the battery current is charging at a charge rate greater than the maximum charge rate, then the active voltage controller 22 decreases the HVDC bus reference voltage and communicates that value to the active rectifier unit 40 by sending a control signal representing a magnitude of the new HVDC bus reference voltage. The active rectifier unit 40 responds to that control signal by decreasing the HVDC bus voltage (step 110), thereby reducing the battery charge rate. If a determination is made in step 108 that the current into the battery is not greater than the maximum charge rate, then the active voltage controller 22 next determines whether the battery state of charge (SOC) is less than the minimum SOC reserve or not (step 112).

State of charge (SOC) is the equivalent of a fuel gauge for the battery pack in a battery-powered electric vehicle. The units of SOC are percentage points (0%=empty; 100%=full). Usually, the SOC cannot be measured directly but can be estimated from direct measurement variables. For example, the active voltage controller 22 may be configured to calculate the SOC by integrating the battery current over time.

If a determination is made in step 112 that the battery SOC is not less than the minimum SOC reserve, then the active voltage controller 22 determines whether a mission request to increase the power drawn from the battery has been received or not (step 114). If a determination is made in step 114 that a mission request to increase the power drawn from the battery has not been received, then the active voltage controller 22 returns to step 102. If a determination is made in step 114 that a mission request to increase the power drawn from the battery has been received, then the active voltage controller 22 decreases the HVDC bus reference voltage and communicates that value to the active rectifier unit 40 by sending a control signal representing a magnitude of the new HVDC bus reference voltage. The active rectifier unit 40 responds to that control signal by decreasing the HVDC bus voltage (step 110), thereby increasing the discharge rate of the battery (step 116). The active voltage controller 22 then returns to step 102.

If a determination is made in step 112 that the battery SOC is less than the minimum SOC reserve, then the active voltage controller 22 determines whether the fuel reserve is less than the minimum fuel reserve or not (step 118). If a determination is made in step 118 that the fuel reserve is less than the minimum fuel reserve, then the active voltage controller 22 sends a message to the pilots to initiate descent (step 120). If a determination is made in step 118 that the fuel reserve is not less than the minimum fuel reserve, then the active voltage controller 22 performs steps 122 and 126.

In step 122, the active voltage controller 22 determines whether the whether a mission request to increase the power drawn from the generator has been received or not. If a determination is made in step 122 that a mission request to increase the power drawn from the generator has not been received, then the active voltage controller 22 returns to step 102. If a determination is made in step 122 that a mission request to increase the power drawn from the generator has been received, then the active voltage controller 22 increases the HVDC bus reference voltage and communicates that value to the active rectifier unit 40 by sending a control signal representing a magnitude of the new HVDC bus reference voltage. The active rectifier unit 40 responds to that control signal by increasing the HVDC bus voltage (step 124), thereby reducing the battery discharge rate. (As used herein, the terms "decrease" and "reduce" are interchangeable synonyms.) The active voltage controller 22 then returns to step 102.

In step 126, the active voltage controller 22 determines whether the whether a mission request to charge the battery has been received or not. If a determination is made in step 126 that a mission request to charge the battery has not been received, then the active voltage controller 22 returns to step 102. If a determination is made in step 126 that a mission request to charge the battery has been received, then the active voltage controller 22 increases the HVDC bus reference voltage and communicates that value to the active rectifier unit 40 by sending a control signal representing a magnitude of the new HVDC bus reference voltage. The active rectifier unit 40 responds to that control signal by increasing the HVDC bus voltage to a level greater than the battery voltage (step 128), thereby first reducing the discharge rate and then increasing the charge rate of the battery. The active voltage controller 22 then returns to step 102.

The active voltage controller 22 also receives commands from the aircraft flight power management controller 12 (hereinafter "FPMC 12"). The FPMC 12 is a computer configured (e.g., by software) to direct the active voltage controller 22 to draw more power from HVDC battery 18 or from the electric generator 14 or to charge the HVDC battery 18. The FPMC 12 also receives information from the active voltage controller 22 on status of the HVDC battery 18, such as current battery SOC and current charging or discharging rate. Based on mission profile, aircraft status, phase of flight, etc., the FPMC 12 is configured to make decisions on how to manage power flow in the system.

Aircraft missions vary from one flight to another. Some flights are short range and some have longer ranges. Aircraft weight also could change from one flight to another, which weight change affects the range of the aircraft. For very short flights and/or lighter loads, it would be advantageous to use more battery power to reduce fuel consumption. Typically the battery or batteries onboard the aircraft are recharged on the ground. Conversely, for longer flights and heavier loads, more hydrocarbon fuel could be used, while the battery provides assistance during some flight phases. During descent, if electric propulsion motors are used to decelerate an aircraft, the resulting regenerative power could be used to charge the battery. The function of the FPMC 12 is to perform power flow management in a hybrid electric aircraft to optimize overall energy usage and reduce fuel burn during a particular mission.

Figure 4:
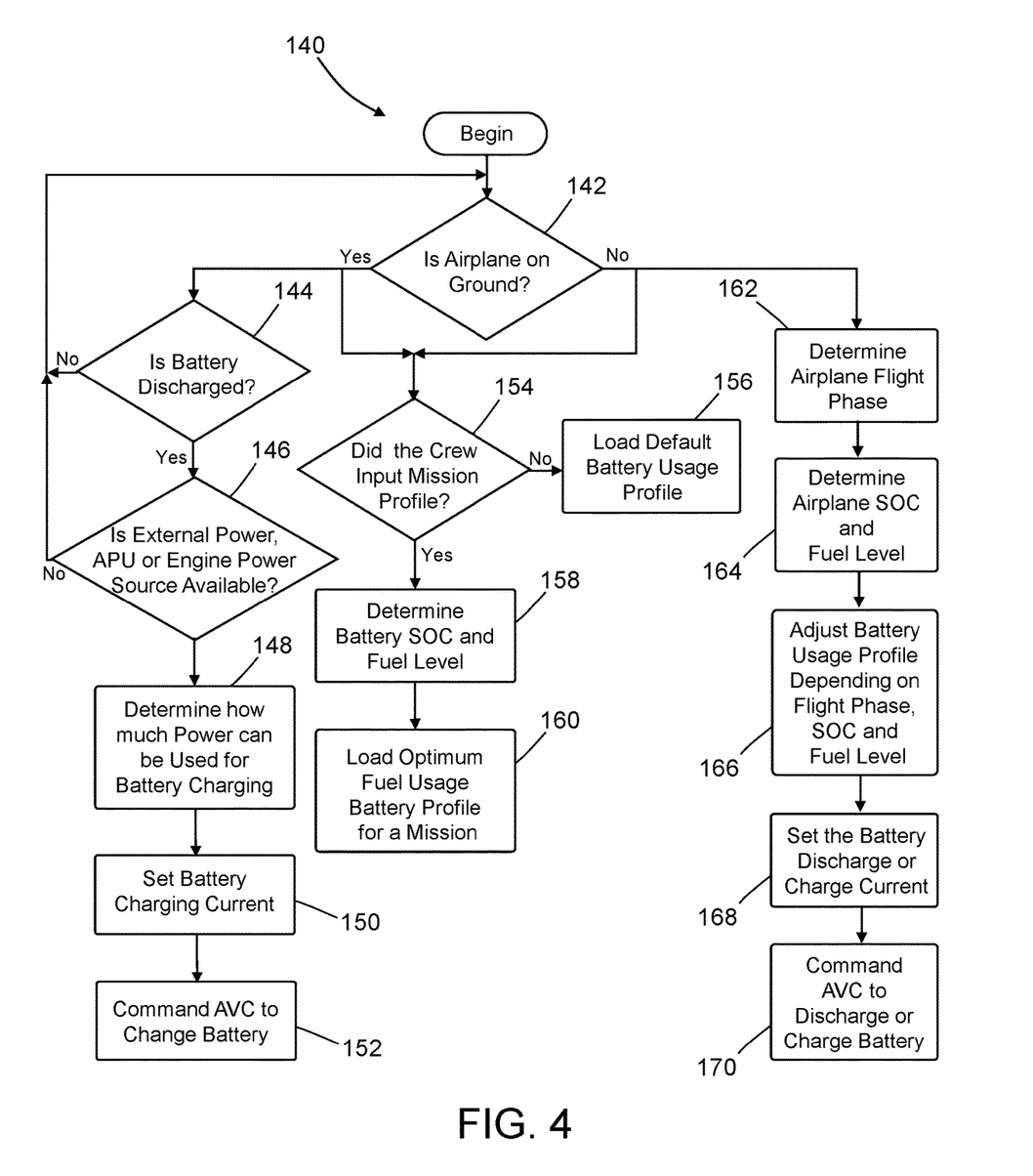
FIG. 4 is a flowchart identifying steps of a control algorithm performed by the flight power management controller in accordance with one proposed implementation.

FIG. 4 is a flowchart identifying steps of a control algorithm 140 performed by the FPMC 12 in accordance with one proposed implementation. The FPMC 12 is configured to make a determination whether the aircraft is on the ground or not (step 142). On the one hand, if a determination is made in step 142 that the aircraft is on the ground, then the FPMC 12 determines whether the battery is discharged or not (step 144). On the other hand, if a determination is made in step 142 that the aircraft is not on the ground, then the FPMC 12 determines what the current phase of the flight of the aircraft is (step 162).

Regardless of the outcome of step 142, the FPMC 12 determines in step 154 whether a mission profile has been input by the crew or not. On the one hand, if a determination is made in step 154 that a mission profile has not been input by the crew, the FPMC 12 loads a default battery usage profile (step 156). The default battery usage profile can be established by the typical airplane mission (short- or long-range mission), weight of the aircraft or number of people and amount of cargo on board, and optimization with respect to fuel burn reduction. On the other hand, if a determination is made in step 154 that a mission profile has been input by the crew, the FPMC 12 then determines the battery SOC and the fuel level (step 158). Then the FPMC 12 loads an optimum fuel usage battery profile for a mission (step 160).

The optimum fuel usage battery profile is configured so that the battery is utilized to minimize conventional fuel burn and maximize battery usage. Depending on battery SOC and remaining electrical energy in the battery, weight of the airplane and airplane mission, the optimum fuel usage battery profile will minimize fuel burn by maximizing use of the battery power throughout the flight cycle. The optimum fuel usage battery profile will also ensure that the battery is not over-discharged at the end of flight cycle and that the battery discharge rate does not exceed maximum allowable discharge rate during flight. The default battery usage profile may be different than the optimum fuel usage battery profile. For example, the default battery usage profile may not be optimal from the fuel burn standpoint, but may be optimal from the standpoint of speed or other mission parameter.

As previously mentioned, step 144 is performed following a determination by the FPMC 12 that the aircraft is on the ground. On the one hand, if a determination is made in step 144 that the battery is not discharged, then the FPMC 12 returns to step 142. On the other hand, if a determination is made in step 144 that the battery is discharged, then the FPMC 12 determines whether any one of a plurality of power sources (e.g., external power, auxiliary power unit or engine power) is available or not (step 146). On the one hand, if a determination is made in step 146 that a power source is not available, then the FPMC 12 returns to step 142. On the other hand, if a determination is made in step 146 that a power source is available, then the FPMC 12 determines how much power can be used for charging the HVDC battery 18. After determining how much power can be used for battery charging, the FPMC 12 sets the battery charging current (step 150) and then commands the active voltage controller 22 to charge the battery using the set battery charging current (step 152).

As previously mentioned, step 162 is performed following a determination by the FPMC 12 that the aircraft is not on the ground. Following determination of the aircraft flight phase, the FPMC 12 next determines the battery SOC and the fuel level (step 164). Then the FPMC 12 adjusts the battery usage profile in dependence on the flight phase, battery SOC and fuel level (step 166). After adjusting the battery usage profile, the FPMC 12 sets the battery discharging or charging current in accordance with the adjusted battery usage profile (step 168) and then commands the active voltage controller 22 to discharge or charge the battery using the set battery discharging or charging current.

While systems and methods for actively controlling the voltage of a bus that supplies electric power from a battery and/or generator to propulsion motors of a hybrid electric aircraft have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via wireline or wireless connections. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. The above examples are exemplary only, and thus are not intended to limit in any way the definition and/or meaning of the term "computer system".

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The structure corresponding to the term "switching means" recited in the appended claims includes contacts, relays and structural equivalents thereof.

The invention claimed is:

1. A hybrid electrical power supply system for supplying current to a load, the hybrid electrical power supply system comprising:
   an AC power source;
   an AC bus;
   first switching means arranged to switchably couple AC power from the AC power source to the AC bus;
   an HVDC power source;
   an active voltage controller configured to generate a control signal representing a magnitude of a HVDC bus reference voltage;
   an active rectifier unit comprising an active rectifier configured to convert AC power to HVDC power and a controller configured to control the active rectifier to adjust an HVDC bus voltage in dependence on the control signal received from the active voltage controller;
   second switching means arranged to switchably couple AC power from the AC bus to the active rectifier unit;
   an HVDC bus coupled to receive DC power from one or both of the HVDC power source and active rectifier unit in dependence on the HVDC bus voltage from the active rectifier unit; and
   an HVDC load coupled to receive HVDC power from the HVDC bus.

2. The hybrid electrical power supply system as recited in claim 1, wherein the HVDC load comprises a motor controller coupled to receive HVDC power from the HVDC bus.

3. The hybrid electrical power supply system as recited in claim 1, further comprising an AC load and third switching means arranged to switchably couple AC power from the AC bus to the AC load.

4. The hybrid electrical power supply system as recited in claim 1, wherein:
   the active voltage controller comprises a computer or processor programmed to generate the control signal in different forms corresponding to different magnitudes of the HVDC bus reference voltage; and
   the controller of the active rectifier unit is configured to control the active rectifier to adjust the HVDC bus voltage of the HVDC bus in dependence on the magnitude of the HVDC bus reference voltage.

5. The hybrid electrical power supply system as recited in claim 1, wherein the AC power source comprises an electrical generator and the HVDC power source comprises a battery.

6. The hybrid electrical power supply system as recited in claim 5, wherein the control signal is a command to increase the HVDC bus voltage when current out of the battery is greater than a maximum discharge rate.

7. The hybrid electrical power supply system as recited in claim 5, wherein the control signal is a command to decrease the HVDC bus voltage when current into the battery is greater than a maximum charge rate.

8. The hybrid electrical power supply system as recited in claim 5, further comprising a flight power management controller configured to send power flow management commands to the active voltage controller to optimize overall energy usage and reduce fuel burn during a particular mission of an aircraft.

9. The hybrid electrical power supply system as recited in claim 8, wherein the active voltage controller generates an initiate descent message when both of first and second conditions are met, the first condition being that a state of charge of the battery is less than a minimum state of charge reserve, and the second condition being that a fuel reserve is less than a minimum fuel reserve.

10. The hybrid electrical power supply system as recited in claim 8, wherein the flight power management controller is further configured to send a command to the active voltage controller to charge the battery if the aircraft is on ground, the battery is discharged and a power source is available.

11. The hybrid electrical power supply system as recited in claim 8, wherein the flight power management controller is further configured to perform operations comprising:
    determining what is a current phase of the flight of the aircraft;
    determining a battery state of charge;
    determining a fuel level;
    adjusting a battery usage profile in dependence on the flight phase, battery state of charge and fuel level;
    setting a battery discharging or charging current in accordance with the adjusted battery usage profile; and
    commanding the active voltage controller to cause the battery to be discharged or charged in accordance with the set battery discharging or charging current.

12. An aircraft comprising:
    an AC power source;
    an AC bus;
    first switching means arranged to switchably couple AC power from the AC power source to the AC bus;
    an HVDC power source;
    an active voltage controller configured to generate a control signal representing a magnitude of a HVDC bus reference voltage based on a current of the HVDC power source;
    an active rectifier unit comprising an active rectifier configured to convert AC power to HVDC power and a controller configured to control the active rectifier to adjust an HVDC bus voltage in dependence on the control signal received from the active voltage controller;
    second switching means arranged to switchably couple AC power from the AC bus to the active rectifier unit;
    an HVDC bus coupled to receive DC power from one or both of the HVDC power source and active rectifier unit in dependence on the HVDC bus voltage from the active rectifier unit;
    an electric propulsion motor coupled to receive HVDC power from the HVDC bus; and
    a propeller operatively coupled to the electric propulsion motor.

13. The aircraft as recited in claim 12, wherein:
the active voltage controller comprises a computer or processor programmed to generate the control signal in different forms corresponding to different magnitudes of the HVDC bus reference voltage; and
the controller of the active rectifier unit is configured to control the active rectifier to adjust the HVDC bus voltage of the HVDC bus in dependence on the magnitude of the HVDC bus reference voltage.

14. The aircraft as recited in claim 12, further comprising a flight power management controller configured to send power flow management commands to the active voltage controller to optimize overall energy usage and reduce fuel burn during a particular mission.

15. The aircraft as recited in claim 12, wherein the AC power source comprises an electrical generator and the HVDC power source comprises a battery.

16. The aircraft as recited in claim 15, wherein the active voltage controller generates an initiate descent message when both of first and second conditions are met, the first condition being that a state of charge of the battery is less than a minimum state of charge reserve, and the second condition being that a fuel reserve is less than a minimum fuel reserve.

17. The aircraft as recited in claim 15, further comprising a flight power management controller configured to send a command to the active voltage controller to charge the battery if the aircraft is on ground, the battery is discharged and a power source is available.

18. The aircraft as recited in claim 15, further comprising a flight power management controller configured to perform operations, if the aircraft is in flight, comprising:

determining what is a current phase of the flight of the aircraft;
determining a battery state of charge;
determining a fuel level;
adjusting a battery usage profile in dependence on the flight phase, battery state of charge and fuel level;
setting a battery discharging or charging current in accordance with the adjusted battery usage profile; and
commanding the active voltage controller to cause the battery to be discharged or charged in accordance with the set battery discharging or charging current.

19. A method for supplying HVDC power to an HVDC load via an HVDC bus that is coupled to receive DC power from one or both of an HVDC power source and an active rectifier unit that is coupled to an AC power source, the method comprising:
generating a control signal in an active voltage controller in a form representing a magnitude of a HVDC bus reference voltage; and
controlling the active rectifier unit to adjust an HVDC bus voltage of the HVDC bus in dependence on the magnitude of the HVDC bus reference voltage.

20. The method as recited in claim 19, wherein the AC and HVDC power sources are respectively an electric generator and a battery onboard an aircraft, further comprising:
sending power flow management commands from a flight power management controller onboard the aircraft to the active voltage controller to optimize overall energy usage and reduce fuel burn during a particular mission of an aircraft by adjusting the magnitude of the HVDC bus reference voltage relative to a voltage of the battery.

\* \* \* \* \*

UNITED STATES PATENT AND TRADEMARK OFFICE
CERTIFICATE OF CORRECTION

PATENT NO. : 10,589,635 B1
APPLICATION NO. : 16/289900
DATED : March 17, 2020
INVENTOR(S) : Solodovnik et al.

Page 1 of 4

It is certified that error appears in the above-identified patent and that said Letters Patent is hereby corrected as shown below:

In the Drawings

Delete FIGS. 1, 3, and 4 on Sheets 1, 3, and 4 and substitute FIGS. 1, 3, and 4 on the attached pages.

Signed and Sealed this
Twenty-fifth Day of August, 2020

Andrei Iancu
*Director of the United States Patent and Trademark Office*